United States Patent [19]

Matsuda

[11] Patent Number: 4,665,613

[45] Date of Patent: May 19, 1987

[54] APPARATUS FOR FORMING A ROW OF COUPLING ELEMENTS FOR SLIDE FASTENER

[75] Inventor: Yasuhiko Matsuda, Toyama, Japan

[73] Assignee: Yoshida Kogyo K. K., Tokyo, Japan

[21] Appl. No.: 839,635

[22] Filed: Mar. 14, 1986

[30] Foreign Application Priority Data

Mar. 16, 1985 [JP] Japan .............................. 60-38102[U]

[51] Int. Cl.$^4$ ........................ A41H 37/06; B29D 5/00
[52] U.S. Cl. ..................................... 29/769; 29/33.2; 425/814
[58] Field of Search ................ 264/252, 280, 284, 285, 264/295; 425/391, 814; 29/408-410, 766-776, 33.2

[56] References Cited

U.S. PATENT DOCUMENTS

| | | | |
|---|---|---|---|
| 3,054,149 | 9/1962 | Streicher | 18/56 |
| 3,594,865 | 7/1971 | Erb | 425/814 |
| 3,672,805 | 6/1972 | Porepp | 425/814 |
| 3,688,805 | 9/1972 | Moertell | 425/391 |
| 3,770,361 | 11/1973 | Heimberger | 425/391 |
| 4,182,600 | 1/1980 | Moertel | 425/814 |
| 4,251,912 | 2/1981 | Yosheida | 425/814 |

FOREIGN PATENT DOCUMENTS

| | | | |
|---|---|---|---|
| 669722 | 9/1963 | Canada | 29/12 |
| 59-125506 | 7/1984 | Japan | |

Primary Examiner—Howard N. Goldberg
Assistant Examiner—Steven Nichols
Attorney, Agent, or Firm—Hill, Van Santen, Steadman & Simpson

[57] ABSTRACT

An apparatus, for forming a row of slide fastener coupling element, comprises a continuously rotatable die wheel having an annular peripheral groove for receiving a row of coupling element blanks in folded fashion, and a punching unit for forming coupling heads on the blanks in the groove. The punching unit includes a punch, an eccentric drive mechanism for imparting eccentric motion to the punch, and a linkage for regulating the eccentric motion of the punch, the drive mechanism having an outer ring connected at opposite ends to the punch and the linkage. Owing to the combination of the eccentric motion of the outer ring and the motion of the linkage, the punch is moved so as to follow the rotation of the die wheel while the coupling heads are shaped on each stroke of the punch.

3 Claims, 17 Drawing Figures

APPARATUS FOR FORMING A ROW OF COUPLING ELEMENTS FOR SLIDE FASTENER

BACKGROUND OF THE INVENTION

1. Field of the Invention:

The present invention relates generally to the production of slide fasteners, and more particularly to an apparatus for forming a row of coupling elements for slide fasteners on a rotating die wheel.

2. Description of the Prior Art:

Canadian Pat. No. 669,722 and Japanese Patent Laid-Open Publication No. 59-125506 disclose a coupling-element forming apparatus which comprises a heated die wheel having an annular central groove in its peripheral surface and a pair of rows of circumferentially staggered pins disposed one row on each side of the groove. In this prior apparatus, a monofilament of thermoplastic synthetic resin is wound around the pins on the peripheral surface of the rotating die wheel, and then it is forced into the groove so as to be folded into a succession of U-shaped coupling element blanks, and subsequently the successive U-shaped coupling element blanks are shaped into a final shape as their lower turned portions are deformed by a punch linearly movable into the groove. A primary problem with the known apparatus is that because the punch moves linearly, as shown in FIG. 10 of the accompanying drawings, the coupling heads 9a would be shaped as objectionably flowed to one side, if the die wheel is continuously rotated during the shaping of the coupling heads 9a. Such objectionably deformed coupling heads 9a would impede correct coupling of the resulting coupling elements 12'. In order to avoid such objectionably deformed coupling heads, the die wheel of the known apparatus must be rotated intermittently as the punch reciprocates into and out of the groove. Because of this intermittent rotation of the die wheel, an adequate rate of production cannot be achieved.

SUMMARY OF THE INVENTION

It is therefore on object of the present invention to provide an apparatus for forming a row of coupling elements for slide fasteners which apparatus has a punching unit capable of shaping coupling heads of a correct form while a die wheel is continuously rotated.

According to the present invention, an apparatus, for forming a row of slide fastener coupling element, comprises a continuously rotatable die wheel having an annular peripheral groove for receiving a row of coupling element blanks in folded fashion, and a punching unit for forming coupling heads on the blanks received in the groove. The punching unit includes a punch, an eccentric drive mechanism for imparting eccentric motion to the punch, and a linkage for regulating the eccentric motion of the punch, the drive mechanism having an outer ring connected at opposite ends to the punch and the linkage. Owing to the combination of the eccentric motion of the outer ring and the motion of the linkage, the punch is moved so as to follow the rotation of the die wheel while the coupling heads are shaped on each stroke of the punch. With this arrangement it is possible to shape the coupling heads with accuracy while the die wheel is continuously rotated.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

Figure 1:
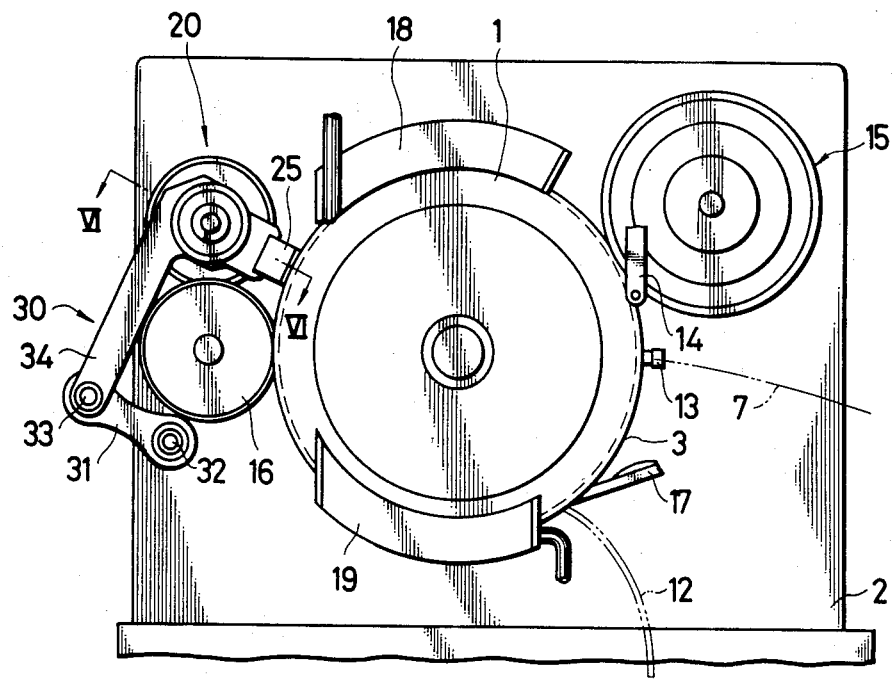
FIG. 1 is a front elevational view of an apparatus for forming a row of zigzag coupling elements according to the present invention.
Figure 2A:
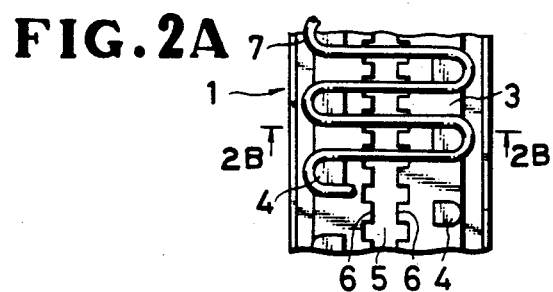
FIGS. 2A, 3A, 4A and 5A are fragmentary enlarged plan views of a die wheel, illustrating the manner in which a monofilament is progressively shaped into a row of zigzag coupling elements.
Figure 2B:
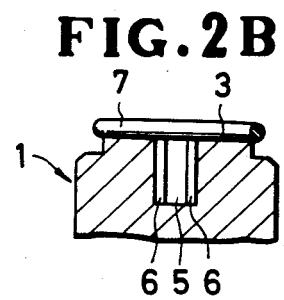
FIGS. 2B, 3B, 4B and 5B are cross-sectional views taken along lines 2B—2B, 3B—3B, 4B—4B, and 5B—5B of FIGS. 2A, 3A, 4A and 5A, respectively.

As shown in FIG. 1, an apparatus for forming a row of continuous zigzag coupling elements 12 for slide fasteners comprises a die wheel 1 mounted on a frame 2 for continuous rotation. As shown in FIGS. 2A and 2B, the die wheel 1 has an annular central groove 5 in its peripheral surface 4, and a pair of rows on of circumferentially staggered pins 4, 4 disposed one row each side of the groove 5, there being a pair of rows of circumferentially staggered projections 6, 6 on opposite side walls of the groove 5.

Figure 3A:
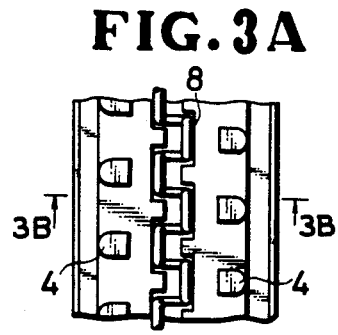
Figure 3B:
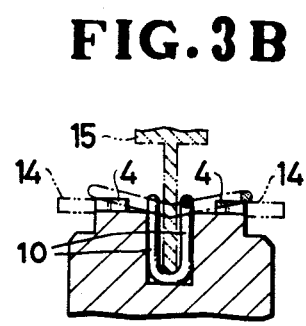

The apparatus also includes a winding unit 13 (FIG. 1) for winding a monofilament 7 of thermoplastic synthetic resin alternately around the pins 4 across the central groove 5 in a zigzag form (FIG. 2A), a lifting unit 14 for lifting up the zigzag monofilament 7 away from the pins 4 (FIG. 3B), and a bending unit 15 for forcing the lifted zigzag monofilament 7 into the central groove 5 to form a row of zigzag coupling element blanks 8 having parallel legs 10 interconnected at their lower ends by lower connecting portions (FIGS. 3A and 3B).

Figure 4A:
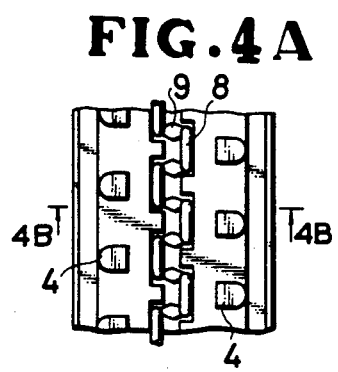
Figure 4B:
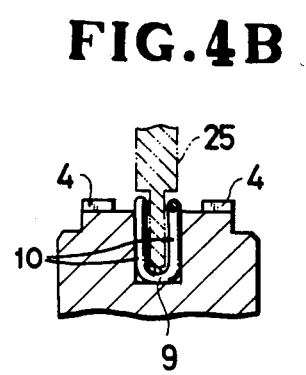
Figure 5A:
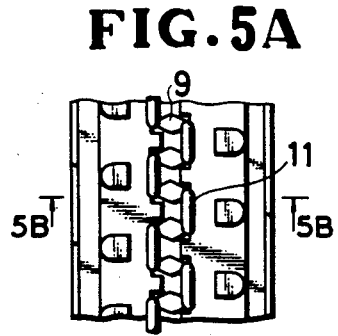
Figure 5B:
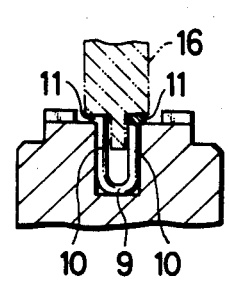

The apparatus still also includes a punching unit 20 (FIG. 1) for deforming each lower connecting portion to form a coupling head 9 having a pair of lateral projections (FIGS. 4A and 4B), a hammering unit 16 (FIG. 5B) for bending upper end portions of the parallel legs 10 laterally outwardly away from each other to form raised connecting portions 11, 11 interconnecting adjacent coupling element blanks 8, and a discharging unit 17 FIG. 1 for removing the thus formed coupling elements 12 from the die wheel 1. The die wheel 1 is heated by a heating unit 18 disposed on the upper side of the die wheel 1 and is cooled by a cooling unit 19 disposed on the lower side of the die wheel 1.

Figure 6:
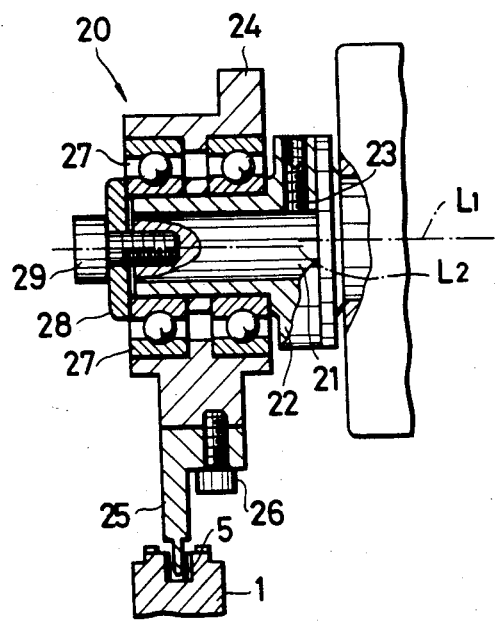
FIG. 6 is a cross-sectional view taken along line VI—VI of FIG. 1.
Figure 8:
FIG. 8, appearing with FIG. 6, is a fragmentary side elevational view of the zigzag-shaped monofilament having been folded into successive U-shaped coupling element blanks.
Figure 9:
FIG. 9, appearing with FIG. 6, is a view similar to FIG. 8, showing a row of coupling elements each having a coupling head shaped by the punch according to the present invention.
Figure 10:
FIG. 10, appearing with FIG. 6, is a view similar to FIG. 9, showing a row of coupling elements each having an objectionably deformed coupling head shaped by a conventional punch.

The punching unit 20 is disposed on the rear side of the die wheel 1 (FIG. 1) and includes a punch 25, an eccentric drive mechanism for moving the punch 25, and a linkage 30 for regulating the movement of the punch 25. As shown in FIG. 6, the eccentric drive mechanism includes an eccentric drive shaft 21 having an axis L2 eccentric to the axis L1 of a driving shaft (not numbered), an eccentric adjusting sleeve 22 of a circumferentially increasing thickness mounted on the eccentric drive shaft 21 and secured thereto by means of a set screw 23. An outer ring 24 is rotatably mounted on the eccentric adjusting sleeve 22 via a bearing 27, and an inner ring of the bearing 27 is fixedly secured to the eccentric drive shaft 21 by means of a washer 28 and a screw 29 threadedly extending into a free end of the eccentric drive shaft 21. By loosening the screws 23, 29, the eccentric adjusting sleeve 22 can be circumferentially moved about the eccentric drive shaft 21 through an angle for adjusting the distance by which the center of the outer ring 24 deviates from the axis L1 of the unnumbered driving shaft.

The punch 25 is attached by a screw 26 to one end of the outer ring 24 so as to face the peripheral surface 3 of the die wheel 1 in registry with the groove 5. As shown in FIG. 1, the linkage 30 includes a first rod 34 extending from the other end of the outer ring 24 remotely from the punch 25, and a second rod 31 pivotally mounted at one end on the frame 2 by means of a pin 32 and pivotally connected at the other end 33 to a distal end of the first rod 34. The first and second rods 34, 31 are pivotable, in response to eccentric motion of the outer ring 24 caused by the rotation of the eccentric drive shaft 21, for regulating the motion of the outer ring 24.

Figure 7A:
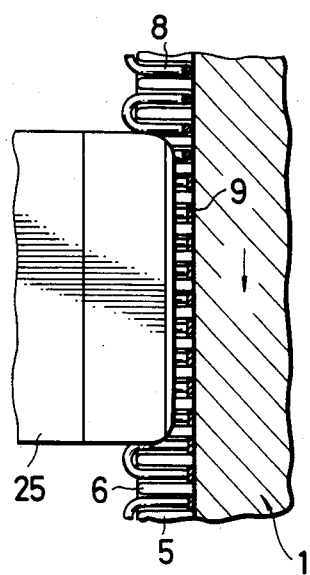
FIGS. 7A through 7D are cross-sectional views taken along an annular peripheral groove of the die wheel, illustrating the movement of a punch.
Figure 7B:
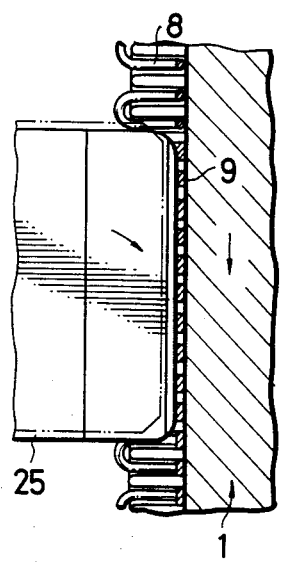

FIGS. 7A through 7D illustrate a sequence of movements of the punch 25 during a single rotation of the eccentric drive shaft 21, showing the manner in which several successive coupling heads 9 are formed on the lower connecting portions of the folded coupling element blanks 8. Firstly, a punching head of the punch 25 is disposed midway in the annular central groove 5, as shown in FIG. 7A. Then as the eccentric drive shaft 21 starts rotating to cause eccentric motion, the punch 25 is moved toward the bottom of the groove 5, and at the same time, it is also moved in the direction of rotation of the die wheel 1, namely, from the phantom-line position to the solid-line position in FIG. 7B, thus pressing several lower connecting portions of the folded coupling element blanks 8 against the bottom of the groove 5 to form coupling heads 9.

Figure 7C:
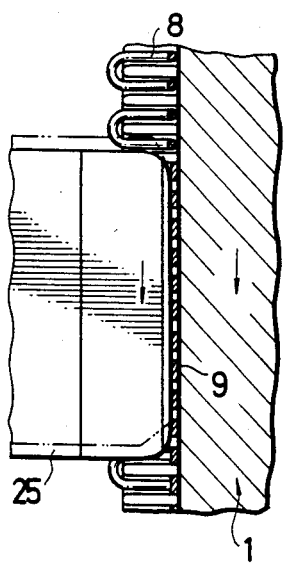
Figure 7D:
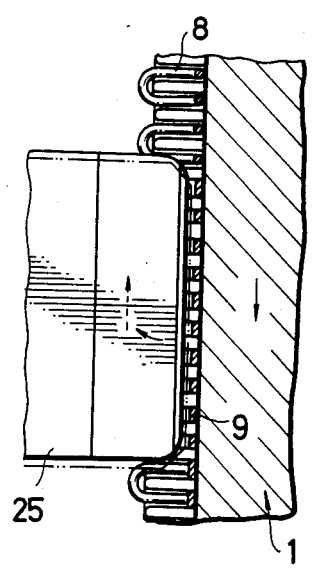

The formation of the coupling heads 9 continues as the punch 25 is further moved from the phantom-line position to the solid-line position in FIG. 7C, following the rotation of the die wheel 1. Finally, the punch 25 is moved gradually away from the bottom of the groove 5, and at the same time, it is also moved in a direction opposite to the rotation of the die wheel 1, from the phantom-line position to the solid-line position in FIG. 7D. As a result, the punch 25 returns to the initial position of FIG. 7A and hence a single cycle of movements of the punch 25 has been completed.

Thus, owing to the combination of the eccentric motion of the eccentric drive shaft 21 and the motion of the linkage 30, the punch 25 is moved along a flat oval course at a speed substantially equal to the pheripheral speed of the die wheel 1. It is therefore possible to form the coupling heads 9 with accuracy while the die wheel 1 is continuously rotated.

The degree to which the lower connecting portions of the coupling element blanks 8 are compressed by the punch 25 can be adjusted by turning the eccentric adjusting sleeve 22 with respect to the eccentric drive shaft 21. Also, the orbital course along which the punch 25 is moved may be varied by selecting a desired length of the individual rod 31, 34 with the linkage 30 in combination of the distance by which the axis of the eccentric adjusting sleeve 22 deviates from the axis L1 of the unnumbered driving shaft. Moreover, if more than one rod is added to the linkage 23, a much better orbital course for the punch 25 can be achieved. If the distance between the center of the outer ring 24 and the axis L1 of the driving shaft does not need to be adjusted and is equal to the distance between the axis L2 of the eccentric drive shaft 21 and the axis L1 of the driving shaft, the eccentric adjusting sleeve 22 may be omitted and hence the punch may be mounted on the eccentric drive shaft 21 via only the bearing 27.

Although the coupling elements are formed from a monofilament in the illustrated embodiment, the present invention is equally useful when applied to the case where the coupling elements are to be formed from a succession of laterally spaced coupling element blanks molded on a molding die wheel and interconnected by a pair of longitudinal connecting threads in a ladder-like fashion.

According to the present invention, since the outer ring 24 mounted on the eccentric drive shaft 21 is connected at one end to the punch 25 and at the other end to the linkage 30, the punch 25 is movable so as to follow the rotation of the die wheel 1, owing to the combination of the eccentric motion of the eccentric drive mechanism and the motion of the linkage 30. With this arrangement it is possible to form coupling heads 9 of the coupling elements 12 with accuracy while the die wheel 1 is continuously rotated, and therefore it is possible to manufacture good quality coupling elements without reducing the rate of production.

Although various minor modifications may be suggested by those versed in the art, it should be understood that I wish to embody within the scope of the patent warranted hereon, all such embodiments as reasonably and properly come within the scope of my contribution to the art.

What is claimed is:

1. An apparatus for forming a row of coupling elements for slide fasteners from a row of coupling element blanks of thermoplastic synthetic resin, comprising:
   (a) a frame;
   (b) a die wheel mounted on said frame for continuous rotation and having an annular groove in its peripheral surface for receiving the row of coupling element blanks in U-shaped folded fashion; and
   (c) a punching unit mounted on said frame in confronting relation to said peripheral surface of said die wheel for punching the folded coupling element blanks in said groove to form coupling heads, said punching unit including
      (1) an eccentric drive shaft eccentrically connected to a driving shaft rotatably supported on said frame for eccentric rotation,
      (2) an outer ring mounted on said eccentric drive shaft and responsive to the eccentric rotation thereto for eccentric motion, (3) a punch mounted on one end of said outer ring and projecting into said annular groove for shaping the coupling heads on the folded coupling element blanks, and (4) a linkage connected to the other end of said outer ring for regulating the eccentric motion of said outer ring in such a manner that said punch follows the rotation of said die wheel while the coupling heads are shaped on each stroke of said punch.

2. An apparatus according to claim 1, said punching unit further including an eccentric adjusting sleeve disposed between said eccentric drive shaft and said outer ring, said eccentric adjusting sleeve having a circumferentially gradually increasing thickness and being adjustably mounted on said eccentric drive shaft.

3. An apparatus according to claim 1, said linkage including a first rod extending from said outer ring, and a second rod pivotally connected at one end to a distal end of said first rod and pivotally mounted at the other end to said frame.

* * * * *